United States Patent
Byon et al.

(10) Patent No.: US 12,264,615 B2
(45) Date of Patent: Apr. 1, 2025

(54) TURBOCHARGER INCLUDING AN ACTUATOR HOUSING WITH A THROUGH HOLE

(71) Applicant: IHI Corporation, Tokyo (JP)

(72) Inventors: Jinhee Byon, Tokyo (JP); Masashige Takahashi, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/391,922

(22) Filed: Dec. 21, 2023

(65) Prior Publication Data

US 2024/0125245 A1  Apr. 18, 2024

Related U.S. Application Data

(63) Continuation of application No. PCT/JP2022/024077, filed on Jun. 16, 2022.

(30) Foreign Application Priority Data

Oct. 22, 2021 (JP) .................. 2021-173278

(51) Int. Cl.
| | |
|---|---|
| *F02B 37/18* | (2006.01) |
| *F01D 17/10* | (2006.01) |
| *F01D 25/08* | (2006.01) |

(52) U.S. Cl.
CPC .......... *F02B 37/186* (2013.01); *F01D 17/105* (2013.01); *F01D 25/08* (2013.01); *F02B 37/18* (2013.01); *F05D 2220/40* (2013.01); *F05D 2260/606* (2013.01); *Y02T 10/12* (2013.01)

(58) Field of Classification Search
CPC .............................................. F02B 37/18–186
See application file for complete search history.

(56) References Cited

U.S. PATENT DOCUMENTS

| | | |
|---|---|---|
| 2003/0185672 A1 | 10/2003 | Suganami et al. |
| 2009/0158731 A1 | 6/2009 | Shimura et al. |
| 2013/0049502 A1* | 2/2013 | Gotoh .................. F02B 37/186 |
| | | 310/80 |

FOREIGN PATENT DOCUMENTS

| | | |
|---|---|---|
| EP | 0014452 A2 * | 8/1980 |
| EP | 2 006 532 A1 | 12/2008 |
| JP | 56-165721 A | 12/1981 |
| JP | 4-118757 U | 10/1992 |
| JP | 5-42711 U | 6/1993 |
| JP | 9-172750 A | 6/1997 |
| JP | 2546353 Y2 | 8/1997 |
| JP | 2003-289648 A | 10/2003 |
| JP | 2007-325382 A | 12/2007 |
| JP | 2009-2409 A | 1/2009 |

(Continued)

OTHER PUBLICATIONS

International Search Report issued Sep. 6, 2022 in PCT/JP2022/024077 filed on Jun. 16, 2022, 2 pages.

*Primary Examiner* — Laert Dounis
(74) *Attorney, Agent, or Firm* — Oblon, McClelland, Maier & Neustadt, L.L.P.

(57) ABSTRACT

A turbocharger includes an actuator housing in which an actuator that drives a movable member is disposed, a compressor housing disposed adjacent to the actuator housing, and a through hole formed in the actuator housing in an area closer to the compressor housing and extending in a vertically downward direction when the actuator housing is mounted.

8 Claims, 6 Drawing Sheets

(56) References Cited

FOREIGN PATENT DOCUMENTS

| | | | |
|---|---|---|---|
| JP | 2013194524 A | * | 9/2013 |
| JP | 2016-11655 A | | 1/2016 |
| JP | 2016-145547 A | | 8/2016 |
| JP | 6687292 B2 | | 4/2020 |

* cited by examiner

TURBOCHARGER INCLUDING AN ACTUATOR HOUSING WITH A THROUGH HOLE

CROSS REFERENCE TO RELATED APPLICATIONS

This application is a continuation application of International Application No. PCT/JP2022/024077, filed on Jun. 16, 2022, which claims priority to Japanese Patent Application No. 2021-173278 filed on Oct. 22, 2021, the entire contents of which are incorporated herein by reference.

BACKGROUND ART

Technical Field

The present disclosure relates to a turbocharger. Conventionally, a turbine housing may be provided with a wastegate port and a wastegate valve that opens and closes the wastegate port. Patent Literature 1 discloses a wastegate actuator for rotating and driving a wastegate valve. The wastegate actuator includes an actuator housing and accommodates an actuator therein. The actuator housing is provided with a breathing hole that connects an internal space to an external space.

CITATION LIST

Patent Literature

Patent Literature 1: JP H5-42711 U

SUMMARY

Technical Problem

However, if water enters the actuator housing through the breathing hole, it may cause malfunction of the actuator.

The purpose of the present disclosure is to provide a turbocharger that can reduce water entering an actuator housing.

Solution to Problem

To solve the above problem, a turbocharger of the present disclosure includes an actuator housing in which an actuator that drives a movable member is disposed, a compressor housing disposed adjacent to the actuator housing, and a through hole formed in the actuator housing in an area closer to the compressor housing and extending in a vertically downward direction when the actuator housing is mounted.

A protrusion extending in the vertically downward direction may be formed on the actuator housing, and the through hole may extend in the vertically downward direction along a direction of extension of the protrusion.

A waterproof breathable membrane may be provided in the through hole.

The turbocharger may include a heat shield plate covering at least a part of the actuator housing, and the through hole may be disposed in a space between the actuator housing and the holder that holds the actuator housing or the heat shield plate.

Effects of Disclosure

According to the present disclosure, water entering the actuator housing can be reduced.

DESCRIPTION OF EMBODIMENTS

Embodiments of the present disclosure will be described in detail below with reference to the accompanying drawings. Specific dimensions, materials, and numerical values described in the embodiment are merely examples for a better understanding, and do not limit the present disclosure unless otherwise specified. In this specification and the drawings, duplicate explanations are omitted for elements having substantially the same functions and configurations by assigning the same sign. Furthermore, elements not directly related to the present disclosure are omitted from the figures.

Figure 1:
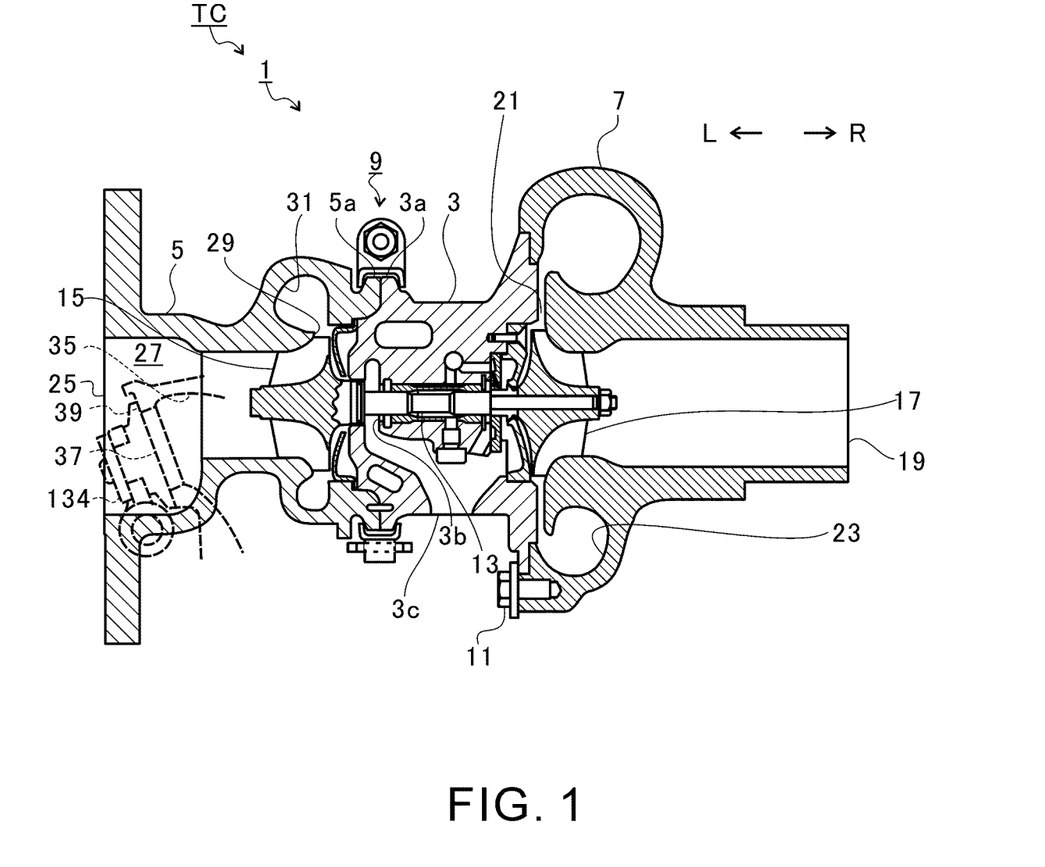
FIG. 1 is a schematic cross-sectional view of a turbocharger.

FIG. 1 is a schematic cross-sectional view of a turbocharger TC. Hereinafter, a direction indicated by an arrow L in FIG. 1 is described as a left side of the turbocharger TC. A direction indicated by an arrow R in FIG. 1 is described as a right side of the turbocharger TC. As shown in FIG. 1, the turbocharger TC comprises a turbocharger body 1. The turbocharger body 1 includes a bearing housing 3, a turbine housing 5, and a compressor housing 7. The turbine housing 5 is connected to the left side of the bearing housing 3 by a fastener 9. The compressor housing 7 is connected to the right side of the bearing housing 3 by fastening bolts 11.

A projection 3a is provided on an outer surface of the bearing housing 3. The projection 3a is provided on a side closer to the turbine housing 5. The projection 3a protrudes in a radial direction of the bearing housing 3. A projection 5a is provided on an outer surface of the turbine housing 5. The projection 5a is provided on a side closer to the bearing housing 3. The projection 5a protrudes in a radial direction of the turbine housing 5. The bearing housing 3 and the turbine housing 5 are banded by the fastener 9. The fastener 9 includes, for example, a G-coupling. The fastener 9 clamps the projections 3a and 5a.

A bearing hole 3b is formed in the bearing housing 3. The bearing hole 3b passes through the bearing housing 3 in a left-to-right direction of the turbocharger TC. A bearing is disposed in the bearing hole 3b. A shaft 13 is inserted into the bearing. The bearing rotatably supports the shaft 13. In the present embodiment, the bearing is a sliding bearing. However, the bearing is not limited thereto, and may be a rolling bearing. A turbine impeller 15 is provided at a left end of the shaft 13. The turbine impeller 15 is rotatably accommodated in the turbine housing 5. A compressor impeller 17 is provided at a right end of the shaft 13. The compressor impeller 17 is rotatably accommodated in the compressor housing 7. Lubricant delivered from a pump (not shown) is led to the bearing hole 3b via an oil path (not shown). The lubricant flowing into the bearing hole 3b is supplied to the bearing provided in the bearing hole 3b. As such, the bearing is lubricated. After lubricating the bearing, the lubricant is discharged from an oil outlet 3c to an outside of the turbocharger TC. The turbocharger TC is mounted on an engine (not shown). The turbocharger TC is mounted on the engine so that the oil outlet 3c faces vertically downward.

An inlet 19 is formed in the compressor housing 7. The inlet 19 opens to the right side of the turbocharger TC. The inlet 19 is connected to an air cleaner (not shown). A diffuser flow path 21 is formed by surfaces of the bearing housing 3 and the compressor housing 7. The diffuser flow path 21 pressurizes air. The diffuser flow path 21 is formed into an annular shape. The diffuser flow path 21 is connected to the inlet 19 via the compressor impeller 17 at a radially inner part.

A compressor scroll flow path 23 is formed in the compressor housing 7. For example, the compressor scroll flow path 23 is located outside the diffuser flow path 21 in a radial direction of the shaft 13. The compressor scroll flow path 23 is connected to an intake port of the engine (not shown) and the diffuser flow path 21. When the compressor impeller 17 rotates, air is sucked into the compressor housing 7 from the inlet 19. The sucked air is pressurized and accelerated while passing through blades of the compressor impeller 17. The pressurized and accelerated air is further pressurized in the diffuser flow path 21 and the compressor scroll flow path 23. The pressurized air is directed to the intake port of the engine.

An outlet 25 is formed in the turbine housing 5. The outlet 25 opens to the left side of the turbocharger TC. The outlet 25 is connected to an exhaust gas purifier (not shown). An internal space 27 is formed inside the turbine housing 5. The internal space 27 is connected to the outlet 25. The internal space 27 is formed downstream of the turbine impeller 15 (on a side closer to the outlet 25).

A connecting path 29 and a turbine scroll flow path 31 are formed in the turbine housing 5. For example, the turbine scroll flow path 31 is located outside the connecting path 29 in the radial direction of the shaft 13. The turbine scroll flow path 31 is connected to a gas inlet 33 (see FIG. 2). Exhaust gas discharged from an exhaust manifold of the engine (not shown) is directed to the gas inlet 33. The connecting path 29 connects the turbine scroll flow path 31 to the outlet 25 (internal space 27) via the turbine impeller 15. The exhaust gas led from the gas inlet 33 to the turbine scroll flow path 31 is directed to the outlet 25 via the connecting path 29, the turbine impeller 15, and the internal space 27. The exhaust gas led to the outlet 25 rotates the turbine impeller 15 while passing therethrough.

A rotational force of the turbine impeller 15 is transmitted to the compressor impeller 17 via the shaft 13. As the compressor impeller 17 rotates, the air is pressurized as described above. As such, the air is directed to the intake port of the engine.

Figure 2:
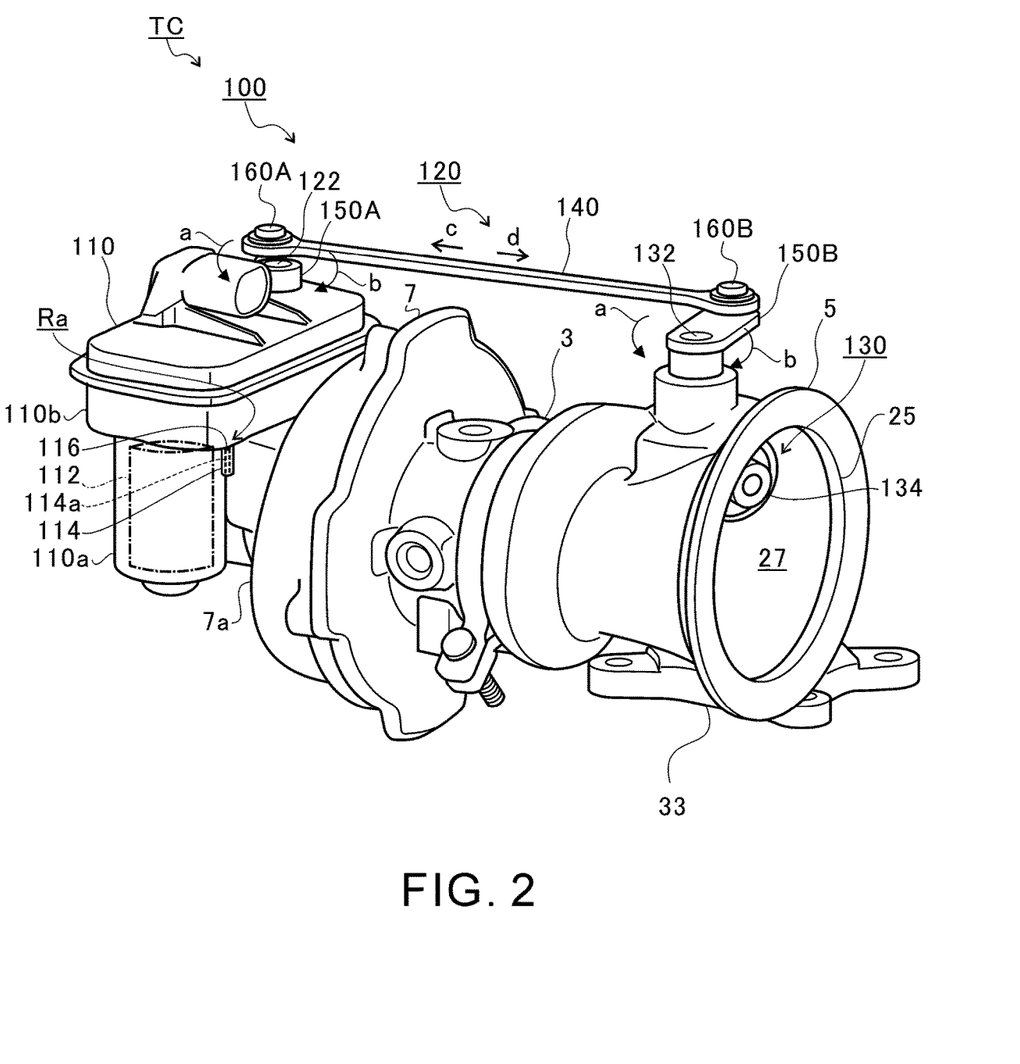
FIG. 2 is an external view of the turbocharger according to an embodiment.

FIG. 2 is an external view of the turbocharger TC according to the present embodiment. As shown in FIG. 2, the turbocharger TC is provided with a driving device 100. The driving device 100 includes an actuator housing 110, a link mechanism 120, and a rotating structure (movable member) 130.

As shown in FIG. 2, the actuator housing 110 and the link mechanism 120 are disposed outside the bearing housing 3, the turbine housing 5, and the compressor housing 7. The rotating structure 130 is disposed inside the turbine housing 5.

The actuator housing 110 is disposed on a side closer to the compressor housing 7 with respect to the bearing housing 3. The actuator housing 110 is disposed on a side spaced apart from the bearing housing 3 and the turbine housing 5 with respect to a scroll portion 7a of the compressor housing 7. The compressor scroll flow path 23 is formed inside the scroll portion 7a. The turbine housing 5 is heated by the exhaust gas discharged from the engine. Accordingly, the actuator housing 110 is disposed at a position spaced apart from the turbine housing 5 so as to be less affected by heat from the turbine housing 5. Specifically, the actuator housing 110 is disposed opposite to the turbine housing 5 across the bearing housing 3 and the scroll portion 7a.

The actuator housing 110 is disposed adjacent to the compressor housing 7. In the present embodiment, the actuator housing 110 is disposed so as to face the scroll portion 7a of the compressor housing 7 in a rotational axis direction of the compressor impeller 17. However, the actuator housing 110 is not limited thereto, and may be disposed so as to face the scroll portion 7a of the compressor housing 7 in a radial direction of the compressor impeller 17.

The actuator housing 110 includes an actuator container 110a and a transmission container 110b. The actuator container 110a is located vertically below the transmission container 110b. The actuator container 110a includes an accommodation space to accommodate an actuator 112. The actuator 112 is disposed in the accommodation space in the actuator container 110a. The transmission container 110b includes an accommodation space to accommodate a transmission (not shown) that is connected to the actuator 112. The transmission (not shown) is disposed in the accommodation space in the transmission container 110b.

The actuator 112 is, for example, a motor. A rotary shaft of the motor is connected to the link mechanism 120 via the transmission accommodated in the transmission container 110b. The actuator 112 rotates a rotary shaft 122 of the link mechanism 120 around a central axis (in directions indicated by arrows a and b in FIG. 2) via the transmission. Furthermore, the actuator 112 rotates and drives the rotating structure 130 via the link mechanism 120.

The link mechanism 120 includes a rod 140, an actuator link plate 150A, a valve link plate 150B, an actuator connecting pin 160A, and a valve connecting pin 160B.

The actuator link plate 150A is configured to rotate around a central axis of rotation of the rotary shaft 122. The actuator link plate 150A integrally rotates with the rotary shaft 122. The actuator link plate 150A rotates in the directions indicated by the arrows a and b in FIG. 2 around the central axis of rotation of the rotary shaft 122. The actuator connecting pin 160A is inserted into the actuator link plate 150A at a different position from the rotary shaft 122.

The actuator connecting pin 160A and the valve connecting pin 160B are inserted into the rod 140. One end of the rod 140 is connected to the actuator link plate 150A via the actuator connecting pin 160A, and the other end is connected to the valve link plate 150B via the valve connecting pin 160B.

The actuator connecting pin 160A connects the rod 140 to the actuator link plate 150A in a relatively rotatable manner. A disc spring (not shown) is disposed between the actuator link plate 150A and the rod 140. The disc spring biases the rod 140 and the actuator link plate 150A in directions moving apart from each other. Vibration transmission between the rod 140 and the actuator link plate 150A is curbed by disposing the disc spring between the rod 140 and the actuator link plate 150A. Surface hardening treatment such as electroless nickel treatment or nitriding treatment is applied to the actuator connecting pin 160A. This improves the wear resistance of the actuator connecting pin 160A.

The valve link plate 150B is configured to rotate around a central axis of rotation of a rotary shaft 132 of the rotating structure 130. The rotary shaft 132 integrally rotates with the valve link plate 150B. The valve link plate 150B rotates around the central axis of the rotary shaft 132 in directions indicated by arrows a and b in FIG. 2. The valve connecting pin 160B is inserted into the valve link plate 150B at a different position from the rotary shaft 132.

The valve connecting pin 160B connects the rod 140 to the valve link plate 150B in a relatively rotatable manner. A disc spring (not shown) is disposed between the valve link plate 150B and the rod 140. The disc spring biases the rod 140 and the valve link plate 150B in directions moving apart from each other. Vibration transmission between the rod 140 and the valve link plate 150B is curbed by disposing the disc spring between the rod 140 and the valve link plate 150B. Surface hardening treatment such as electroless nickel treatment or nitriding treatment is applied to the valve connecting pin 160B. This improves the wear resistance of the valve connecting pin 160B.

When the actuator 112 operates, the actuator link plate 150A rotates in the direction indicated by the arrow a, or in the direction indicated by the arrow b in FIG. 2 around the central axis of rotation of the rotary shaft 122. As the actuator link plate 150A rotates in the direction indicated by the arrow a in FIG. 2, the rod 140 moves in a direction indicated by an arrow c in FIG. 2. When the rod 140 moves in the direction indicated by the arrow c in FIG. 2, the valve link plate 150B rotates in the direction indicated by the arrow a in FIG. 2 around the central axis of rotation of the rotary shaft 132.

When the actuator link plate 150A rotates in the direction indicated by the arrow b in FIG. 2, the rod 140 moves in a direction indicated by an arrow d in FIG. 2. As the rod 140 moves in the direction indicated by the arrow d in FIG. 2, the valve link plate 150B rotates in the direction indicated by the arrow b in FIG. 2 around the central axis of rotation of the rotary shaft 132 of the rotating structure 130.

The rotating structure 130 includes the rotary shaft 132 and a valve 134. A cylindrical bearing (not shown) is provided in the turbine housing 5. The bearing rotatably supports the rotary shaft 132. The rotary shaft 132 is connected to the valve link plate 150B at one end and to the valve 134 at the other end.

As shown in FIG. 1, a bypass flow path 35 and a wastegate port 37 are formed in the turbine housing 5. The bypass flow path 35 is connected to the turbine scroll flow path 31 at one end, and is connected to the internal space 27 at the other end via the wastegate port 37. The bypass flow path 35 connects the turbine scroll flow path 31 to the internal space 27. The bypass flow path 35 and the wastegate port 37 are located radially outside the turbine impeller 15. The bypass flow path 35 directs a portion of the exhaust gas flowing in the turbine scroll flow path 31 to the internal space 27 with bypassing the turbine impeller 15.

The wastegate port 37 is formed, in an inner wall forming the internal space 27 of the turbine housing 5, on a seating surface 39 that can be contacted by the valve 134. The wastegate port 37 is formed downstream of the turbine impeller 15 (on the side closer to the outlet 25). The wastegate port 37 connects the bypass flow path 35 to the internal space 27.

The valve 134 is a valve body whose outer diameter is larger than an inner diameter of the wastegate port 37. In the present embodiment, the valve 134 is a wastegate valve. When contacting the seating surface 39, the valve 134 closes the wastegate port 37. When the wastegate port 37 is closed, the exhaust gas flowing in the turbine scroll flow path 31 does not flow into to the internal space 27 via the bypass flow path 35 and the wastegate port 37.

When spaced apart from the seating surface 39, the valve 134 opens the wastegate port 37. When the wastegate port 37 is opened, a portion of the exhaust gas flowing in turbine scroll flow path 31 flows into the internal space 27 via the bypass flow path 35 and the wastegate port 37.

Returning to FIG. 2, when the actuator 112 drives the rotary shaft 132 to rotate in the direction indicated by the arrow b in FIG. 2, the valve 134 integrally rotates with the rotary shaft 132 in the direction indicated by the arrow b in FIG. 2. As the valve 134 rotates in the direction indicated by the arrow b, the valve 134 moves in the direction moving apart from the seating surface 39. When the valve 134 is spaced apart from the seating surface 39, the wastegate port 37 is opened. In contrast, when the actuator 112 drives the rotary shaft 132 to rotate in the direction indicated by the arrow a in FIG. 2, the valve 134 integrally rotates with the rotary shaft 132 in the direction indicated by the arrow a in FIG. 2. As the valve 134 rotates in the direction indicated by the arrow a, the valve 134 moves in the direction approaching the seating surface 39. When the valve 134 approaches and contacts the seating surface 39, the wastegate port 37 is closed.

In the present embodiment, a protrusion 114 is formed on the actuator housing 110. The protrusion 114 is formed in a vertically lower part of the transmission container 110b. The protrusion 114 is formed so as to extend in a vertically downward direction from a vertically lower surface of the transmission container 110b. Furthermore, the protrusion 114 is disposed adjacent to an outer surface of the actuator container 110a. However, the protrusion 114 is not an essential component. Accordingly, the actuator housing 110 may not be provided with the protrusion 114. Furthermore, the protrusion 114 is provided with a through hole 114a to eliminate a pressure difference between an internal space and an external space of the actuator housing 110. If the protrusion 114 is not formed in the actuator housing 110, the through hole 114a is formed, for example, directly on the vertically lower surface of the transmission container 110b of the actuator housing 110. The through hole 114a is formed so as to pass through an inner surface and an outer surface of the actuator housing 110. The through hole 114a connects the internal space of the actuator housing 110 to the external space.

If water enters the actuator housing 110 from the through hole 114a, it may cause malfunction of the actuator 112. Accordingly, the direction of extension of the through hole 114a is set to a horizontal direction or to the vertically downward direction. In the present embodiment, the through hole 114a extends in the vertically downward direction along the direction of extension of the protrusion 114.

Figure 3:
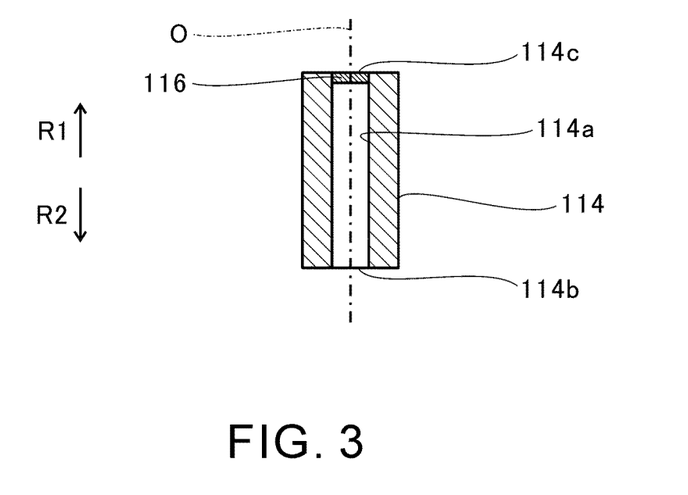
FIG. 3 is a schematic cross-sectional view of a protrusion according to the embodiment.

FIG. 3 is a schematic cross-sectional view of the protrusion 114 according to the present embodiment. As shown in FIG. 3, the through hole 114a includes an outer opening 114b and an inner opening 114c. The outer opening 114b is formed on the outer surface of the actuator housing 110 and opens to the outside of the actuator housing 110. The outer opening 114b connects an internal space of the through hole 114a to the external space of the actuator housing 110. The inner opening 114c is formed on the inner surface of the actuator housing 110 and opens to the internal space of the actuator housing 110. The inner opening 114c connects the internal space of the through hole 114a to an internal space of the transmission container 110b.

In a cross-section including a central axis O of the through hole 114a, the through hole 114a extends in a vertically downward direction R2 from the inner opening 114c to the outer opening 114b. In other words, the through hole 114a faces in the same vertically downward direction as the oil outlet 3c when the turbocharger TC is mounted on the engine. Specifically, the protrusion 114 is disposed so as to extend from the vertically lower surface of the transmission container 110b (see FIG. 2) in the vertically downward direction R2 when the actuator housing 110 is mounted on the turbocharger TC. Similarly, the through hole 114a is disposed so as to extend from the inner opening 114c to the outer opening 114b in the vertically downward direction R2 when the actuator housing 110 is mounted on the turbocharger TC. The direction of extension of the through hole 114a from the inner opening 114c to the outer opening 114b is set within a range of 90° to 270° when a vertically upward direction R1 is set as 0° and the vertically downward direction R2 is set as 180°.

When the direction of extension of the through hole 114a is 90° or 270°, a height position of the outer opening 114b of the through hole 114a in the vertical direction R1, R2 is equal to a height position of the inner opening 114c in the vertical direction R1, R2. "Equal" means including a case where they are completely equal to each other and a case where they deviate from the completely equal case within a tolerance (machining accuracy, assembly error, etc.). Hereinafter, "equal" or "the same" means including a case where they are completely equal to (the same as) each other and a case where they deviate from the case where they are completely equal to (the same as) each other within an allowable error (machining accuracy, assembly error, etc.).

When the direction of extension of the through hole 114a is greater than 90° and less than 270°, the height position of the outer opening 114b of the through hole 114a in the vertical direction R1, R2 is located on a side of the vertically downward direction R2 with respect to the height position of the inner opening 114c in the vertical direction R1, R2. In other words, the through hole 114a extends in the vertically downward direction when the actuator housing 110 is mounted.

As described above, in the present embodiment, the height position of the outer opening 114b of the through hole 114a in the vertical direction R1, R2 is equal to or below the height of the inner opening 114c in the vertical direction R1, R2. This makes it difficult for water falling in the vertically downward direction R2 to enter the actuator housing 110 via the through hole 114a. Furthermore, when the through hole 114a is formed in the protrusion 114, a length of the through hole 114a in a central axis direction is longer than that of when the through hole 114a is not formed in the protrusion 114. The longer the length of the through hole 114a in the central axis direction, the more difficult it is for water to enter the actuator housing 110 due to pressure loss.

Furthermore, the through hole 114a is provided with a waterproof breathable membrane 116. The waterproof breathable membrane 116 is composed of a material having water repellency and breathability. The waterproof breathable membrane 116 allows a passage of water vapor, which is a gas, and prevents a passage of water, which is a liquid. This prevents water entering the through hole 114a from reaching the actuator 112. The waterproof breathable membrane 116 is provided at the inner opening 114c of the through hole 114a. However, the waterproof breathable membrane 116 may be provided at any position within the through hole 114a, for example, at the outer opening 114b. The waterproof breathable membrane 116 may also be provided at a middle part of the through hole 114a between the outer opening 114b and the inner opening 114c.

Figure 4:
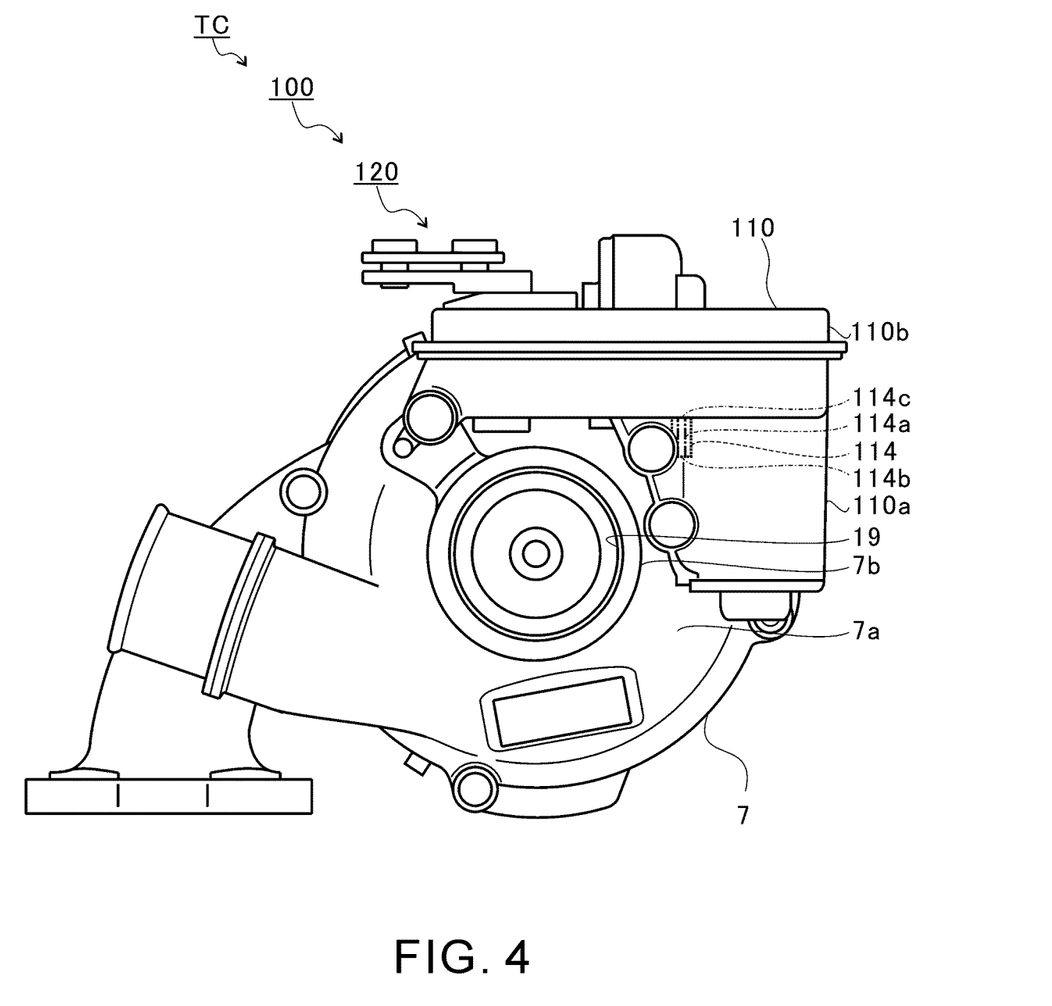
FIG. 4 is a schematic front view of an actuator housing and a compressor housing.

FIG. 4 is a schematic front view of the actuator housing 110 and the compressor housing 7. In FIG. 4, the protrusion 114 and through hole 114a are seen through for simplicity of explanation. As shown in FIG. 4, the compressor housing 7 includes a cylindrical portion 7b in which the inlet 19 is formed.

The outer opening 114b of the through hole 114a is located between the actuator container 110a and the cylindrical portion 7b in the horizontal direction. This makes it difficult for water scattered from a side of the actuator container 110a and a side of the cylindrical portion 7b toward the outer opening 114b to enter the actuator housing 110 via the through hole 114a.

Returning to FIG. 2, the protrusion 114 and the through hole 114a are formed, in the actuator housing 110, in an area closer to the compressor housing 7. For example, the protrusion 114 and the through hole 114a are formed in an area Ra, in the actuator housing 110, that faces the compressor housing 7. In the present embodiment, a portion of the compressor housing 7 or a portion of the bearing housing 3 is provided between the protrusion 114 and the through hole 114a and the turbine housing 5. In other words, the outer opening 114b of the through hole 114a is located in a space between the actuator housing 110 and the compressor housing 7 or the bearing housing 3. This makes it difficult for water scattered from a side of the turbine housing 5 toward the compressor housing 7 to enter the actuator housing 110 via the through hole 114a.

According to the present embodiment, the actuator housing 110 is provided with the through hole 114a that connects the internal space of the actuator housing 110 to the external space. The outer opening 114b of the through hole 114a is located vertically below the transmission container 110b in the actuator housing 110. Furthermore, the through hole 114a extends in the vertically downward direction when the actuator housing 110 is mounted on the turbocharger. This makes it difficult for water falling from vertically above the transmission container 110b to enter the actuator housing 110 via the through hole 114a.

Additionally, the through hole 114a is formed in the area, in the actuator housing 110, closer to the compressor housing 7. Between the through hole 114a and the turbine housing 5 is a portion of the compressor housing 7 or a portion of the bearing housing 3. This prevents water scattered from the side of the turbine housing 5 toward the compressor housing 7 from entering the actuator housing 110 via the through hole 114a.

Furthermore, the through hole 114a is provided with the waterproof breathable membrane 116. This prevents water entering the through hole 114a from reaching the actuator 112.

In addition, the outer opening 114b of the through hole 114a is located between the actuator container 110a and the cylindrical portion 7b in the horizontal direction. This makes it difficult for water scattered from the side of the actuator container 110a and the side of the cylindrical portion 7b toward the outer opening 114b to enter the actuator housing 110 via the through hole 114a.

(First Variant)

Figure 5:
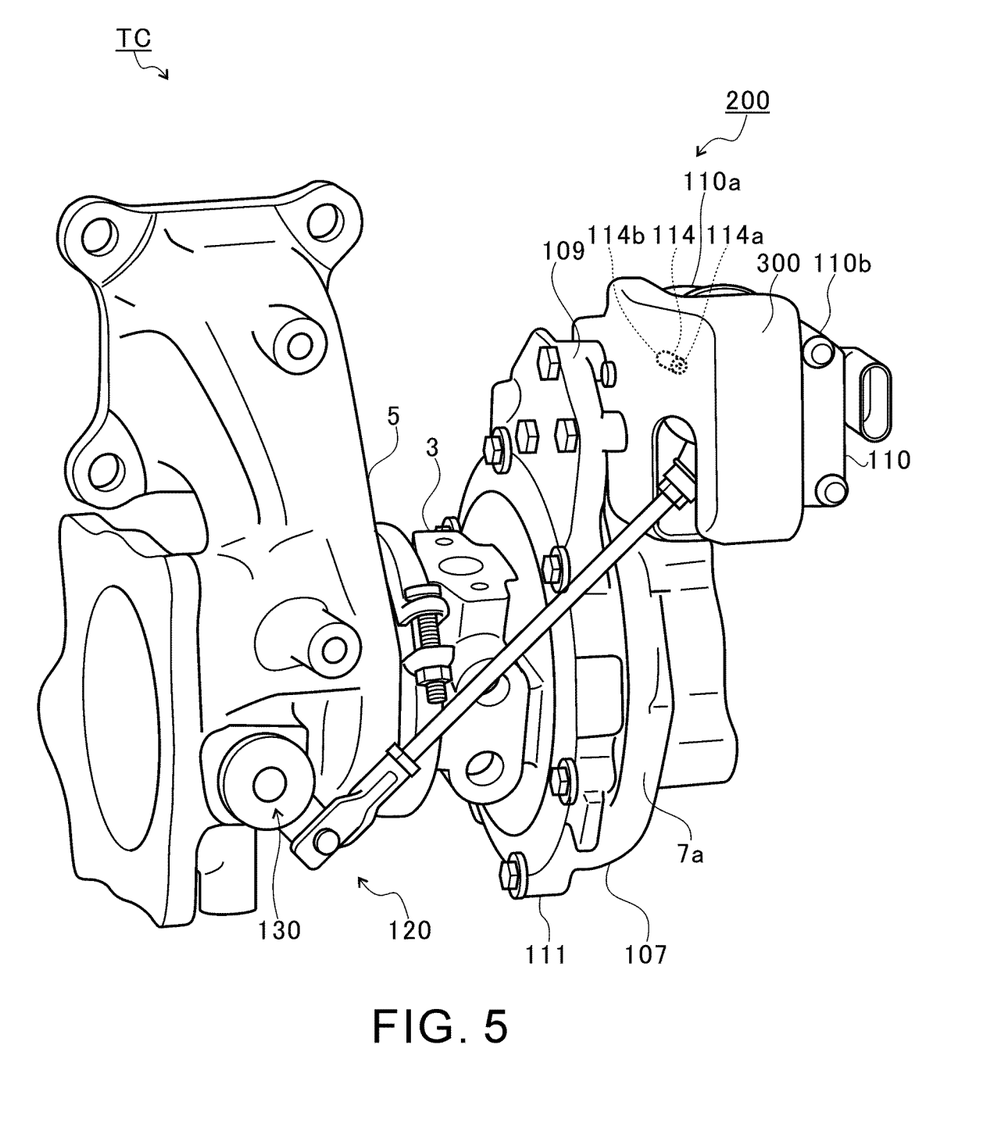
FIG. 5 is an external view of a turbocharger according to a first variant.

FIG. 5 is an external view of the turbocharger TC according to the first variant. In FIG. 5, the protrusion 114 and the through hole 114a are seen through for simplicity of explanation. Components that are substantially equivalent to those of the turbocharger TC of the above embodiment are assigned with the same reference signs and explanations thereof will be omitted. In the turbocharger TC of the first variant, the configurations of the driving device 200 and the compressor housing 107 are different from those of the driving device 100 and the compressor housing 7 of the above embodiment. The other configurations are the same as those of the turbocharger TC of the above embodiment.

The driving device 200 of the first variant includes the actuator housing 110, the link mechanism 120, the rotating structure (movable member) 130, and a heat shield plate 300.

The compressor housing 107 of the first variant includes a flange (holder) 109 for holding the actuator housing 110 and the heat shield plate 300. The flange 109 is formed, in the compressor housing 107, so as to protrude radially outward from a fastener 111 that is fastened to the bearing housing 3. The actuator housing 110 and the heat shield plate 300 are mounted opposite to the bearing housing 3 on the flange 109. The actuator housing 110 is fastened to the flange 109 by bolts through the heat shield plate 300. This allows the flange 109 to hold the actuator housing 110 and the heat shield plate 300. The actuator housing 110 and the heat shield plate 300 are disposed so as to face the scroll portion 7a of the compressor housing 107 in the radial direction of the compressor impeller 17.

In the first variant, the heat shield plate 300 is provided between the actuator housing 110 and the flange 109 of the compressor housing 107. As such, the heat shield plate 300 is provided between the actuator housing 110 and the flange (holder) 109 that holds the actuator housing 110. The heat shield plate 300 covers at least a part of the actuator housing 110. In the first variant, the heat shield plate 300 covers a side closer to the flange 109 in the actuator housing 110. The heat shield plate 300 also covers a vertically upper side of the actuator housing 110. The heat shield plate 300 blocks heat from the turbine housing 5 to the actuator housing 110. The heat shield plate 300 also prevents water scattered from a side of the bearing housing 3 toward the flange 109 from reaching the outer opening 114b of the through hole 114a.

The through hole 114a is disposed in a space enclosed by the actuator container 110a, the transmission container 110b, and the heat shield plate 300. Similar to the above embodiment, in the first variant, the through hole 114a is oriented in the same vertically downward direction as the oil outlet 3c (see FIG. 1) when the turbocharger TC is mounted on the engine. Specifically, the outer opening 114b of the through hole 114a is disposed in a space between the actuator housing 110 and the heat shield plate 300. However, the through hole 114a is not limited thereto, and may be disposed between the actuator housing 110 and the flange 109. In other words, the through hole 114a is disposed between the actuator housing 110 and the flange 109 or the heat shield plate 300. That is, the through hole 114a is disposed in the space between the actuator housing 110 and the flange (holder) 109 or the heat shield plate 300.

According to the first variant, the through hole 114a is disposed in the space between the actuator housing 110 and the flange (holder) 109 or the heat shield plate 300. As a result, water scattered from the side of the bearing housing 3 is prevented more from reaching the outer opening 114b of the through hole 114a, compared to the above embodiment.

(Second Variant)

Figure 6:
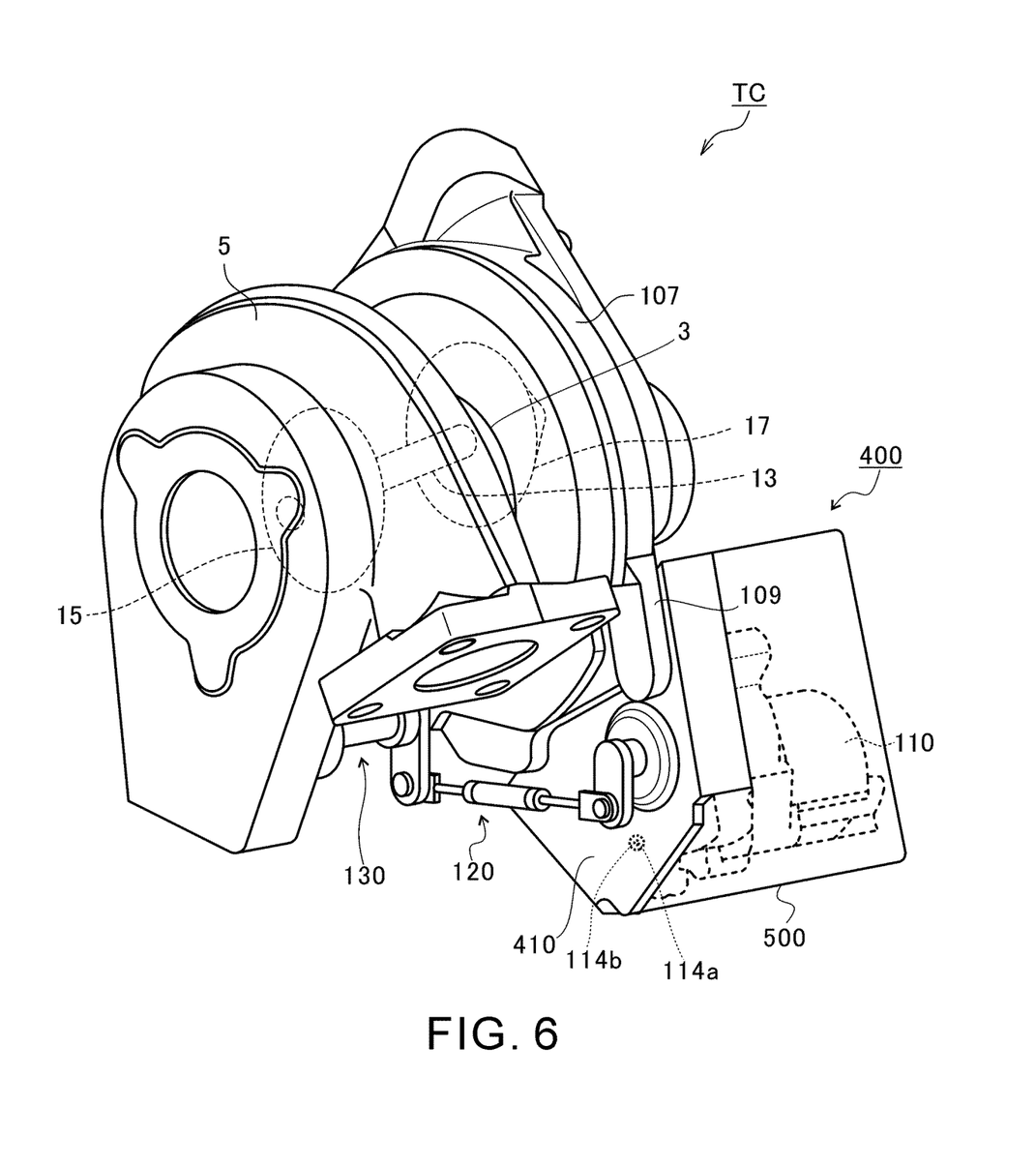
FIG. 6 is an external view of a turbocharger according to a second variant.

FIG. 6 is an external view of the turbocharger TC according to a second variant. In FIG. 6, the through hole 114a is seen through for simplicity of explanation. Components that are substantially equivalent to those of the turbocharger TC of the above embodiment are assigned with the same reference signs and explanations thereof will be omitted. In the turbocharger TC of the second variant, the configuration of the driving device 400 is different from that of the driving device 200 of the above first variant. The other configurations are the same as those of the turbocharger TC of the above first variant.

The driving device 400 of the second variant includes the actuator housing 110, the link mechanism 120, the rotating structure (movable member) 130, a bracket (holder) 410, and a heat shield plate 500.

The compressor housing 107 of the second variant includes the flange 109, and the bracket 410 is mounted opposite to the bearing housing 3 on the flange 109. In addition, the actuator housing 110 and the heat shield plate 500 are mounted opposite to the bearing housing 3 and the flange 109 on the bracket 410. The actuator housing 110 is fastened to the bracket 410 via the heat shield plate 500 by bolts (not shown). This allows the bracket 410 to hold the actuator housing 110 and the heat shield plate 500.

A portion of the heat shield plate 500 is provided between the actuator housing 110 and the bracket 410. As such, the portion of the heat shield plate 500 is provided between the actuator housing 110 and the bracket (holder) 410 that holds the actuator housing 110. The heat shield plate 500 covers at least a part of the actuator housing 110. In the second variant, the heat shield plate 500 covers the entire actuator housing 110. The heat shield plate 500 blocks heat from the turbine housing 5 to the actuator housing 110. The heat shield plate 500 also prevents water scattered from the side of the bearing housing 3 toward the bracket 410 from reaching the outer opening 114b of the through hole 114a.

The through hole 114a is disposed in a space enclosed by the heat shield plate 500. Similar to the above embodiment, in the second variant, the through hole 114a is oriented in the same vertically downward direction as the oil outlet 3c (see FIG. 1) when the turbocharger TC is mounted on the engine. Specifically, the outer opening 114b of the through hole 114a is disposed in a space between the actuator housing 110 and the heat shield plate 500. However, the through hole 114a is not limited thereto, and may be disposed between the actuator housing 110 and the bracket 410. In other words, the through hole 114a is disposed between the actuator housing 110 and the bracket 410 or the heat shield plate 500. That is, the through hole 114a is disposed in the space between the actuator housing 110 and the bracket (holder) 410 or the heat shield plate 500.

According to the second variant, the through hole 114a is disposed in the space between the actuator housing 110 and the bracket (holder) 410 or the heat shield plate 500. As a result, water scattered from the side of the bearing housing 3 is prevented more from reaching the outer opening 114b of the through hole 114a, compared to the above embodiment.

Although embodiments of the present disclosure have been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

In the above embodiment and the variants, the examples in which the actuator 112 rotates and drives the valve 134 have been described. However, the actuator 112 is not limited thereto, and may be applied, for example, to drive a variable stator vane mechanism that varies an opening degree of the connecting path 29 of the turbine housing 5. In this case, the actuator 112 may actuate a rotating structure that rotates nozzle vanes (movable members) of the variable stator vane mechanism.

The above embodiment describes the example in which the waterproof breathable membrane 116 is provided in the through hole 114*a*. However, the waterproof breathable membrane 116 is not an essential component. Accordingly, the waterproof breathable membrane 116 may not be provided in the through hole 114*a*.

The driving device 100 of the above embodiment, the driving device 200 of the above first variant, and the driving device 400 of the above second variant may be combined with each other. For example, the heat shield plate 300 of the above first variant or the heat shield plate 500 of the above second variant may be applied to the driving device 100 of the above embodiment.

In the above second variant, the bracket 410 holding the actuator housing 110 is attached to the compressor housing 107. However, the bracket 410 is not limited thereto, and may also be attached to the bearing housing 3 or the turbine housing 5.

What is claimed is:

1. A turbocharger comprising:
an actuator housing comprising an actuator container, in which an actuator that drives a movable member is disposed, and a transmission container, wherein the actuator container is located vertically below the transmission container,
a compressor housing disposed adjacent to the actuator housing,
a through hole formed in the actuator housing in an area closer to the compressor housing and extending in a vertically downward direction when the actuator housing is mounted, an outer opening of the through hole being located in a space between the actuator container and the compressor housing.

2. The turbocharger according to claim 1,
wherein a protrusion extending in the vertically downward direction is formed on the actuator housing, and
the through hole extends in the vertically downward direction along a direction of the protrusion.

3. The turbocharger according to claim 1,
wherein a waterproof breathable membrane is provided in the through hole.

4. The turbocharger according to claim 2,
wherein a waterproof breathable membrane is provided in the through hole.

5. The turbocharger according to claim 1, comprising:
a heat shield plate covering at least a part of the actuator housing,
wherein the space is between the actuator housing and a holder that holds the actuator housing or the heat shield plate.

6. The turbocharger according to claim 2, comprising:
a heat shield plate covering at least a part of the actuator housing,
wherein the space is between the actuator housing and a holder that holds the actuator housing or the heat shield plate.

7. The turbocharger according to claim 3, comprising:
a heat shield plate covering at least a part of the actuator housing,
wherein the space is between the actuator housing and a holder that holds the actuator housing or the heat shield plate.

8. The turbocharger according to claim 4, comprising:
a heat shield plate covering at least a part of the actuator housing,
wherein the space is between the actuator housing and a holder that holds the actuator housing or the heat shield plate.

* * * * *